(12) United States Patent
Young et al.

(10) Patent No.: US 7,490,799 B2
(45) Date of Patent: Feb. 17, 2009

(54) MULTI-POSITION SUPPORT FOR PTO DRIVE

(75) Inventors: Terry A. Young, Ephrata, PA (US); Michael L. Bandi, Okeechobee, FL (US)

(73) Assignee: CNH America LLC, New Holland, PA (US)

( * ) Notice: Subject to any disclaimer, the term of this patent is extended or adjusted under 35 U.S.C. 154(b) by 588 days.

(21) Appl. No.: 11/158,436

(22) Filed: Jun. 22, 2005

(65) Prior Publication Data

US 2007/0007052 A1    Jan. 11, 2007

(51) Int. Cl.
    A47B 96/06    (2006.01)
(52) U.S. Cl. .................. 248/220.41; 248/220.22; 248/289.11; 211/18
(58) Field of Classification Search ............ 248/220.22, 248/220.42, 220.41, 225.11, 222.52, 289.11, 248/251, 20.22, 225.21, 289.31, 290.1; 211/18, 211/59
See application file for complete search history.

(56) References Cited

U.S. PATENT DOCUMENTS

| | | | | | |
|---|---|---|---|---|---|
| 4,131,259 | A | * | 12/1978 | Franks | 248/311.2 |
| 4,783,033 | A | * | 11/1988 | Valiulis | 248/220.22 |
| 4,871,135 | A | * | 10/1989 | Thalenfeld | 248/220.22 |
| 5,078,276 | A | * | 1/1992 | Rogge et al. | 211/18 |
| 6,289,618 | B1 | * | 9/2001 | Kump et al. | 248/220.42 |
| 6,349,909 | B1 | * | 2/2002 | Zarrow et al. | 248/220.41 |
| 6,412,204 | B1 | * | 7/2002 | Shoemaker et al. | 40/606.15 |
| 6,481,677 | B1 | * | 11/2002 | Yu | 248/220.41 |
| 6,612,057 | B2 | * | 9/2003 | Shoemaker et al. | 40/607.02 |
| 2007/0007052 | A1 | * | 1/2007 | Young et al. | 180/53.4 |

* cited by examiner

*Primary Examiner*—J. Allen Shriver
*Assistant Examiner*—Tan Le
(74) *Attorney, Agent, or Firm*—Patrick M. Sheldrake; Michael C. Harms

(57) ABSTRACT

A multi-position support mechanism for an implement that employs an elongate member pivotably mounted at one end to the tongue of the implement and having a hook on the opposing end. The pivotable connection between the tongue and the elongate member provides a plurality of generally fixed positions, at least one where the hook supports the vehicle pto coupler, at least one for supporting hydraulic hoses, and at least one storage position where the elongate member and the hook are not in use.

13 Claims, 5 Drawing Sheets

MULTI-POSITION SUPPORT FOR PTO DRIVE

BACKGROUND OF THE INVENTION

The present invention relates to hydraulic fluid hose routing devices and PTO (power take-off) supports on an implement, and, more particularly, to a multi-positional bracket that holds provides flexibility to the operator in supporting the PTO and fluid hoses in the various operational conditions the implement assumes.

Many vehicles, implements and other types of equipment include an articulated framework having a pivot assembly across which a plurality of hydraulic fluid hoses pass for conveying pressurized fluid to, and conveying return fluid from hydraulic components carried by one part of the framework. The applications most readily apparent are in the agricultural industry, where tractors provide pressurized hydraulic fluids to a trailing implement affixed to the rear of the tractor by a hitch. The implement can be any of a multitude of known soil preparation, crop planting, harvesting or crop-treating machines, all of which affix to the drawbar of the tractor for pivotal movement as the tractor and implement move around the field. In most cases, at least part of the power required by the implement is provided by the tractor, in the form of pressurized hydraulic fluid that is supplied to the various hydraulic components on the implement by flexible hydraulic hoses or rigid conduits-usually flexible hoses spanning the gap between the tractor and the implement. In many such implements, PTO power is also required, so a relatively short connecting shaft is connect to the PTO output shaft on the tractor and extends across the pivot connection between the tractor drawbar and the implement. A universal joint on both ends of the coupler and a telescoping length adjustment permits the shaft alignment some flexibility and provides for turning of the tractor/implement combination. When the pto coupler is not connected to the tractor, it is usually removed, or left to dangle in location.

Many devices have been designed to hold the flexible hydraulic hoses in a safe position during operation of the tractor/implement combination. Additionally, many devices have been designed to hold the pto coupler when the tractor and implement are not connected. None, however, have been designed to selectively accomplish such multiple purposes in an effective and efficient manner.

It would be a great advantage to provide a support mechanism that overcomes the above problems and disadvantages.

SUMMARY OF THE INVENTION

Accordingly, it is an object of the present invention to provide a multi-purpose support device that overcomes the shortcomings of the prior art.

It is another object of the present invention to provide multi-purpose support mechanism that is lower in cost and more operationally flexible than separate supports.

It is another object of the present invention to provide a multi-purpose support mechanism for an implement that is simple in use, facile in manufacture and cost effective in manufacture.

It is a further object of the present invention to provide a multi-purpose support mechanism for an agricultural implement that is adjustable and convenient in use.

It is a further object of the present invention to provide a multi-purpose support mechanism for an implement that employs a fabricated hook that pivots on a channel mounted to the tongue to engage the pto coupler to hold it in a generally fixed location when not in use.

It is a still further object of the present invention to provide a multi-purpose support mechanism for an implement that employs a fabricated hook that pivots on a channel mounted to the tongue to engage hydraulic hoses to hold them in a generally fixed location when in use.

It is an even still further object of the present invention to provide a multi-position support mechanism for an implement that employs an elongate member pivotably mounted at one end to the tongue of the implement and having a hook on the opposing end. The pivotable connection between the tongue and the elongate member provides a plurality of generally fixed positions, at least one where the hook supports the vehicle pto coupler, at least one for supporting hydraulic hoses, and at least one storage position where the elongate member and the hook are not in use.

These and other objects are achieved by providing a multi-position support mechanism for an implement that employs an elongate member pivotably mounted at one end to the tongue of the implement and having a hook on the opposing end. The pivotable connection between the tongue and the elongate member provides a plurality of generally fixed positions, at least one where the hook supports the vehicle pto coupler, at least one for supporting hydraulic hoses, and at least one storage position where the elongate member and the hook are not in use.

BRIEF DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT(S)

It is common for a farm implement to have a support for the pto or a pto coupler at a convenient location when the machine is disconnected from a tractor, i.e., when not in use. In most cases, the pto coupler is held at or near the height of the pto output shaft on the tractor, making the act of connection easier. It is also common for farm implements to have hydraulic drives and components to have a mechanism for supporting hydraulic hoses, as they are route between the tractor and the implement.

Figure 1:
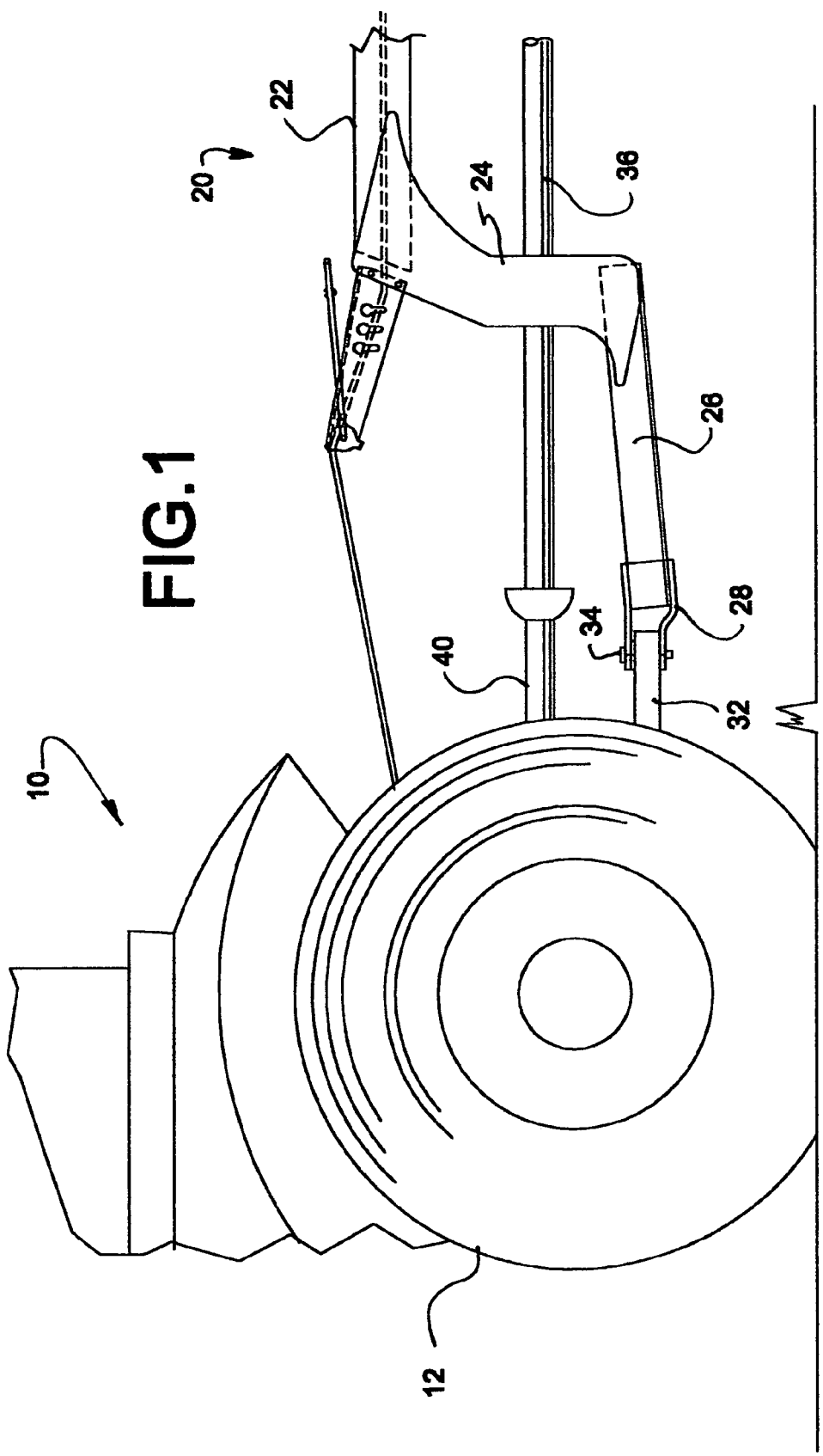
FIG. 1 is a partial side perspective view of a tractor/implement connection, showing the support mechanism of the present invention in a storage position.

Directing attention to FIG. 1, there is shown the rear portion of a tractor 10 with wheel 12 forming one of at least a pair of drive wheels. Behind wheel 12 is located a pto stub shaft (not shown) through which power is transferred to the trailing implement 20. The actual function of implement 20 is not important to the present invention, it only being necessary to understand that it may take many forms. Additionally, item 20 need not necessarily be an agricultural implement, but could be an altogether different type of equipment and instead of a tractor, a specialized drive unit could be used, or a truck with a pto output.

Implement 20 has a forwardly extending tongue 22 that includes a downwardly-extending brace member 24. Member 24 attaches to another forwardly extending member 26, terminating with a hitch 28. The hitch is then selectively and pivotably affixed to the drawbar 32 by a removable hitch pin 34.

The pto stub shaft on the tractor transfers rotary power to the implement driveline 36 through a coupler 40. Typically, coupler 40 is a telescoping member to adjust for varying distances between the forward end of the implement driveline and the pto stub shaft, and has universal joint at each end to allow for further alignment discrepancies. There may be some situations where the implement driveline connects directly to the tractor stub shaft. In such case, some other provisions will have to be relied upon to accommodate the distance variations mentioned.

Figure 2:
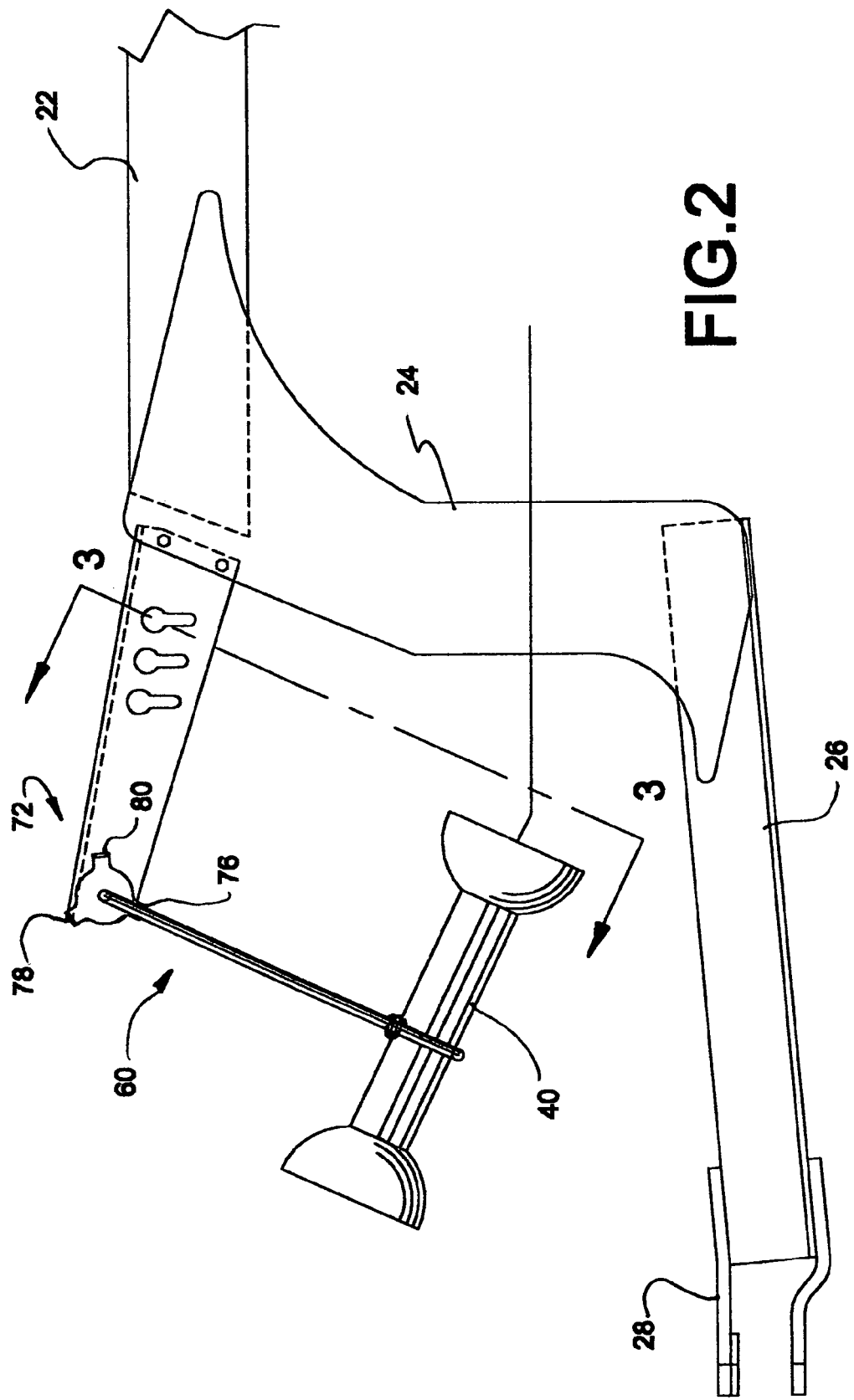
FIG. 2 is a partial side perspective view of the front end tongue area of an implement, showing the support mechanism of the present invention with the hook supporting the pto coupler when not in use.
Figure 3:
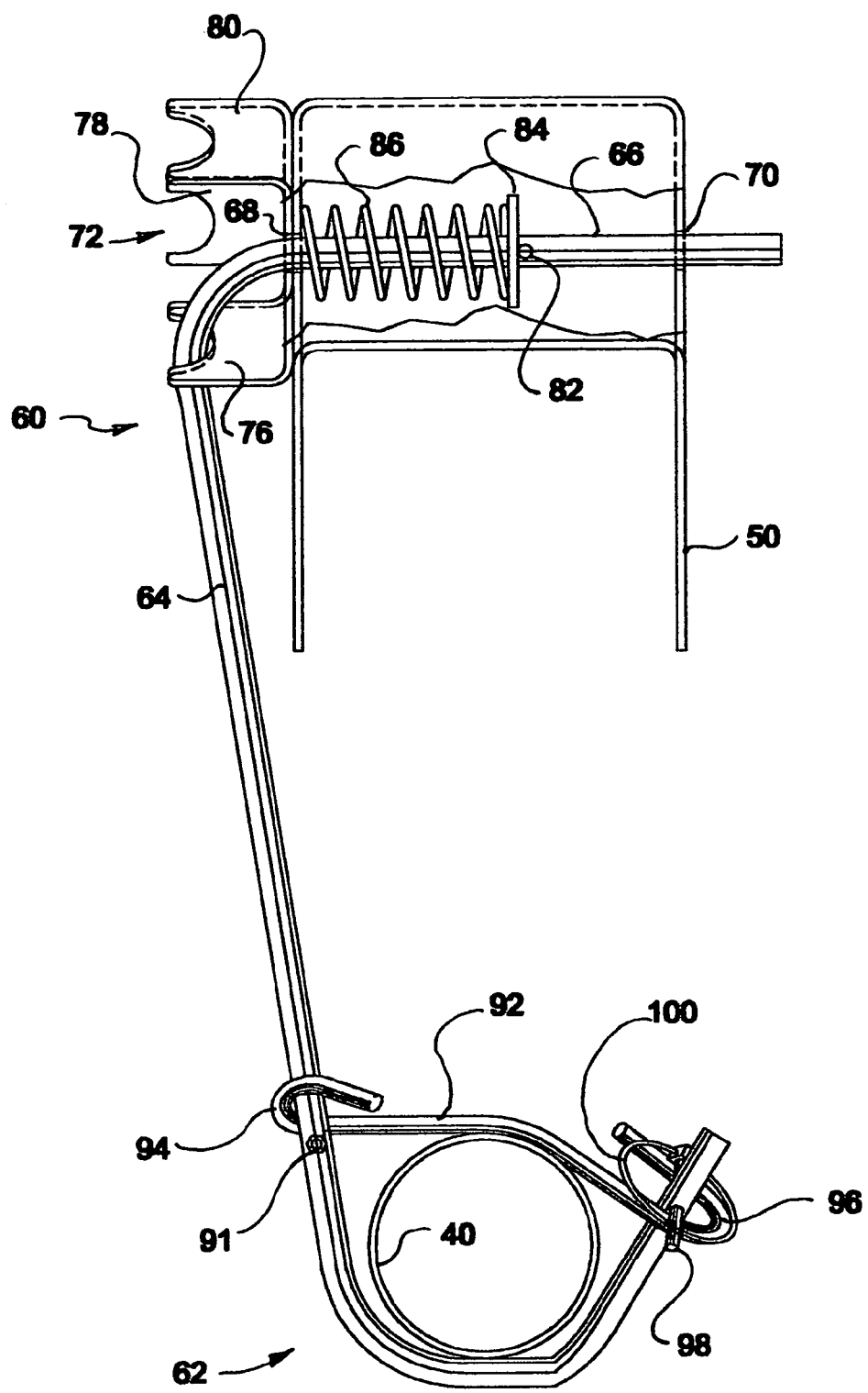
FIG. 3 is a front perspective view of the support mechanism of the present invention with part of the structure in section.

Referring now to FIGS. 2 and 3, it can be seen that the support mechanism 60 is attached a channel member 50 itself affixed to tongue 22 by bolts, welding or other suitable fasteners. A fabricated hook 62 is formed in one end of an elongated rod-like member 64 and an acute angle is formed near the opposing end such that there is a straight portion 66 adjacent that opposing end. The hook 62 and the straight portion 66 are generally in a single plane. Opposing and generally parallel hole 68, 70 through channel 50 receive the straight portion of member 64 such that it can rotate around the axis of the portion 66. A three-position latch 72 is affixed to the outside of channel 50, and is comprised of three tabs 76, 78, 80, each with a semi-circular notch in the outer end, and each located in a different radial position relative to the axis of holes 68, 70 (see, for example, FIG. 2).

The straight portion 66 of member 64 has a small pin 82 thereon or therethrough and extending a short distance outside the circumference of portion 66. A washer 84 is fitted on the portion 66 and a compression spring 86, under medium compression, thus biases pin 82 away from the inside of channel 50, i.e., biases member 64 into engagement with the notch of selected tab 76, 78 or 80.

To provide a more positive holding and to prevent clasp 92 from sliding down member 64 and off the end of hook 62, a bolt 91 is affixed through member 64 in the appropriate location along the length thereof for gripping coupler 40 (see FIG. 3). Bolt 91 extends outwardly from the circumference of member 64, and the bend 94 in clasp 92 is tight enough to cause interference between the two, and thus prevent clasp 92 from moving in the past bolt 91 in the direction of hook 62. Bolt 91 could, in the alternative, be a pin fixed in a hole in member 64.

Clasp 92 is, as discussed above, formed of a relatively light gauge rod and has a bend 94 in the first end, and a larger, more open bend 96 in the opposing end. A removable linchpin 98 extends through a hole through hook 62 adjacent the end thereof. When clasp 92 (loop 96) is retained at the far end of the hook by linchpin 98, clasp 92 is trapped on member 64.

It should be noted that support mechanism 60 could be mounted on either side of channel 50, and the length of member 64 could vary without deviating from the concepts herein disclosed.

Figure 4:
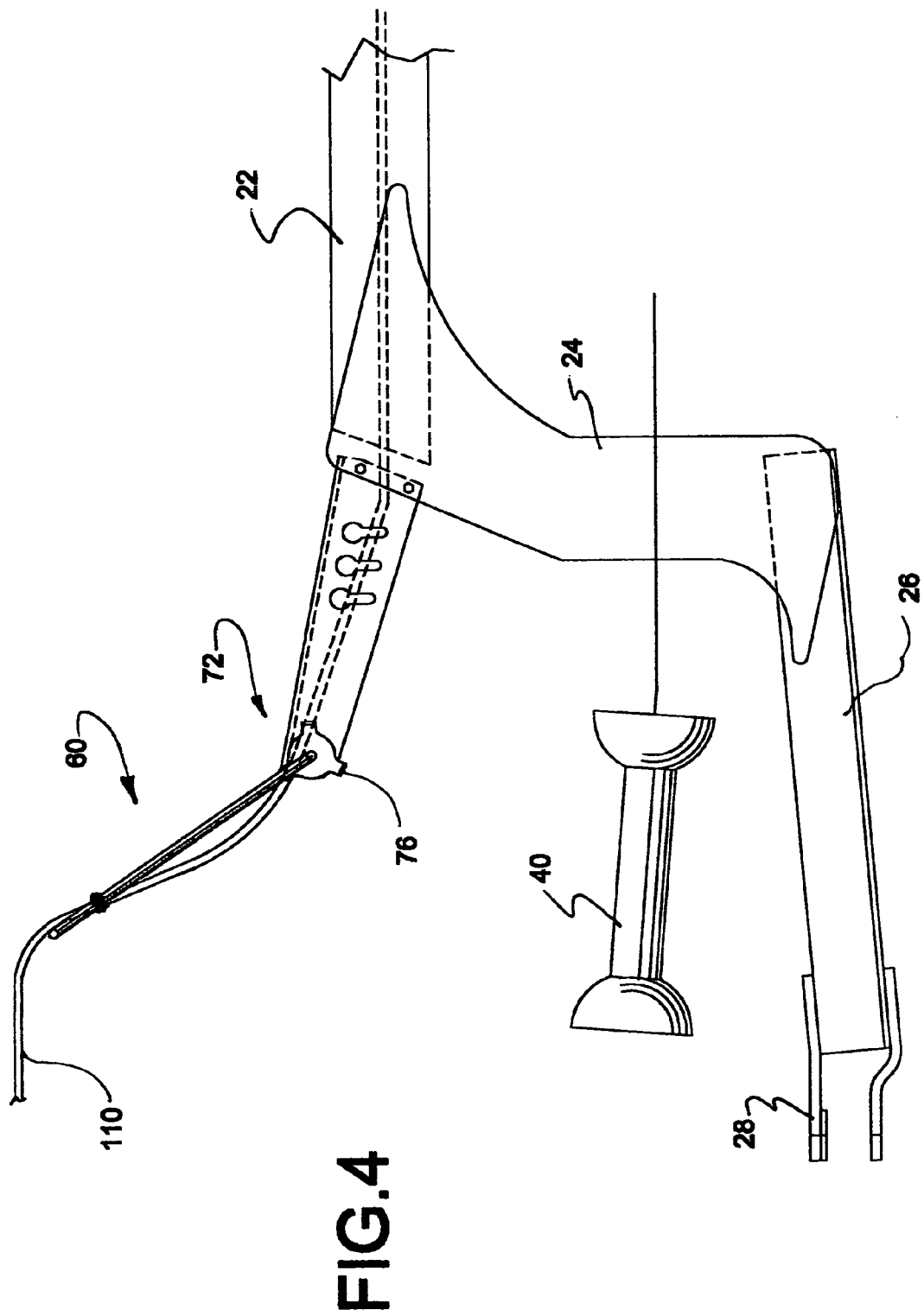
FIG. 4 is a partial side view of the support mechanism of the present invention, showing the hook supporting flexible hydraulic hoses in an operating position and depicting the pto coupler generally in the appropriate location.
Figure 5:
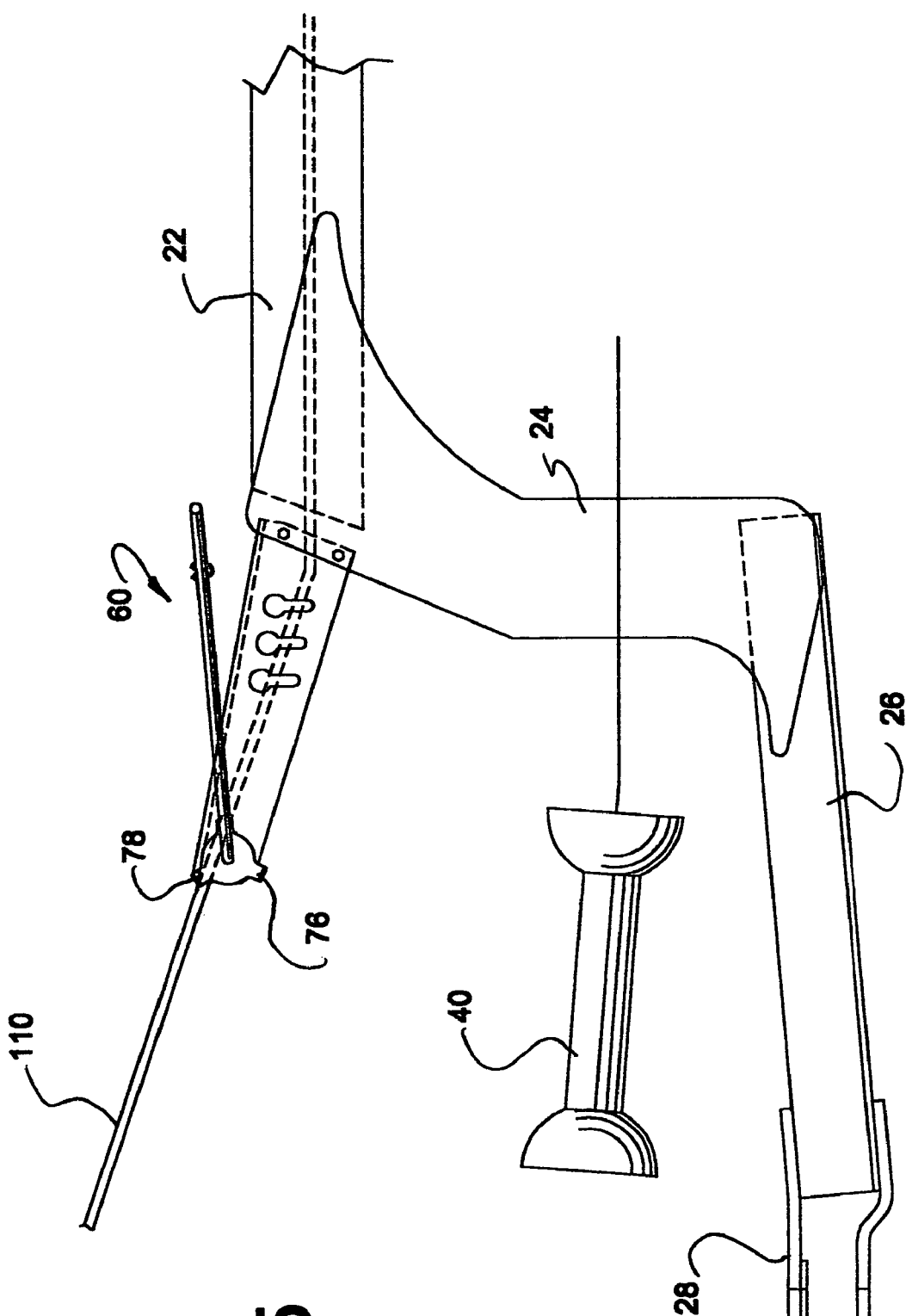
FIG. 5, similar to FIG. 1, is a partial side view of the support mechanism of he present invention, showing the support mechanism in a storage, or non-use, position.

In situations where the implement is not connected to a tractor and not in use, the support mechanism is locked in tab 76 and the coupler 40 is engaged by hook 62, as shown in FIGS. 2 and 3. When the implement is attached to a tractor and hydraulic hoses are required, the support may be locked into tab 78, as shown in FIG. 4. The hook provides a convenient device for maintaining hoses 110 in a relatively high position, out of the way of the operating tractor and implement. When neither the coupler nor hoses require support, the mechanism may be located in tab 80, completely out of the way as shown in FIG. 5.

Naturally, the invention is not limited to the foregoing embodiments, but it can also be modified in many ways without departing from the basic concepts.

Having thus described the invention, what is claimed is:

1. A multi-purpose support for use with an implement that may be attached to a source of rotating and/or hydraulic power, and wherein the implement has a forwardly extending tongue terminating in a connection to the power source, said support comprising:

a generally elongate channel member with a width between first and second opposing side walls and having a first end and an opposing second end, said channel member capable of being affixed to the tongue of the implement at said first end and extending forwardly therefrom in a cantilevered fashion;

an elongate first rod-like member having a first end and an opposing second end, a generally open hook formed in a first direction in said first end thereof and a generally L-shape formed in said first direction in said second end thereof, the longer leg of said L-shape terminating in said hook, said hook and said L-shape being generally in a single plane and the shorter leg of said L-shape being of a greater length than said width between side walls of said channel member;

a first hole through said first side wall and a second hole through said second side wall of said channel member close to said second end thereof, said holes having a generally common horizontal axis;

a plurality of holding tabs affixed to the outside of said first side wall around said first hole and generally equally spaced therefrom;

said shorter leg of said L-shape portion of said first rod-like member extending through said first and second holes in said channel member;

a biasing mechanism biasing said shorter leg of said L-shape portion of said first rod-like member away from said holding tabs toward said second side of said channel member, whereby said elongate member may be selectively moved from one holding tab to another and thereby change the position of said hook relative to said first end of said channel member; and a clasp having a first end having a first loop formed therein and attachable to the first rod-like member and a second end of the clasp having a second loop and selectively movable, the second end of said first rod-like member may enter said second loop and a mechanism to selectively lock said second loop when said first rod-like member is extending through said second loop.

2. The support of claim 1, wherein:
the hook is wide and deep enough to accommodate a pto coupler.

3. The support of claim 1, wherein:
said plurality of holding tabs include tabs that, when engaged by said first rod-like member, can position said hook generally below said channel member, generally above and forwardly of said channel member, and generally above and rearwardly of said channel member.

4. The support of claim 1, wherein said second end of said first rod-like member has a third hole therethrough adjacent said second end thereof, and said mechanism to selectively lock comprises a linchpin inserted through said hole.

5. The support of claim 4, further including:
a fourth hole through said first rod-like member adjacent said hook, and a bolt fixed therethrough and extending outwardly beyond the diameter of said first rod-like member.

6. The support of claim 5, wherein:
said biasing mechanism comprises a washer fixed to said shorter leg of said L-shape portion of said first rod-like member between said first and second sides of said channel member; and
a compression spring mounted on said L-shape portion and compressed between said washer and said second side of said channel member.

7. The support of claim 6, wherein said plurality of holding tabs are three.

8. The support of claim 2, wherein:
said plurality of holding tabs include tabs that, when engaged by said first rod-like member, can position said hook generally below said channel member, generally above and forwardly of said channel member, and generally above and rearwardly of said channel member.

9. The support of claim 8, wherein:
said clasp comprises a second rod-like member with a first end and a second opposing end, said first end of said second rod-like member having an almost closed first loop formed therein through which said first rod-like member extends, said second end of said second rod-like member having a second loop formed therein and selectively movable whereby the second end of said first rod-like member may enter said second loop.

10. The support of claim 9, further including:
a mechanism to selectively lock said second loop when said first rod-like member is extending through said second loop.

11. A multi-purpose support for use with an implement that may be attached to a source of rotating and/or hydraulic power, and wherein the implement has a forwardly extending tongue terminating in a connection to the power source, said support comprising:
an generally elongate channel member with a width between first and second opposing side walls and having a first end and an opposing second end, said channel member capable of being affixed to the tongue of the implement at said first end and extending forwardly therefrom in a cantilevered fashion;
a elongate first rod-like member having a first end and an opposing second end, a generally open hook formed in a first direction in said first end thereof and a generally L-shape formed in said first direction in said second end thereof, the longer leg of said L-shape terminating in said hook, said hook and said L-shape being generally in a single plane and the shorter leg of said L-shape being of a greater length than said width between side walls of said channel member, wherein the hook is wide and deep enough to accommodate a pto coupler;
a first hole though said first side wall and a second hole through said second side wall of said channel member close to said second end thereof, said holes having a generally common horizontal axis;
said shorter leg of said L-shape portion of said first rod-like member extending through said first and second holes in said channel member and rotatable therein;
a mechanism having a plurality of holding tabs for holding said first rod-like member in selective radial locations around said common horizontal axis, whereby said elongate member may be selectively moved from one of said selective location to another and thereby change the position of said hook relative to said first end of said channel member; and
a clasp comprising a second rod-like member with a first end and a second oposing end, said first end of said second rod-like member having a first loop formed therein and attachable to the first rod-like member and, said second end of said second rod-like member having a second loop formed therein and selectively movable, the second end of said first rod-like member may enter said second loop and a mechanism to selectively lock said second loop when said first rod-like member is extending through said second loop.

12. The support of claim 11, wherein:
said plurality of holding tabs include tabs that, when engaged by said first rod-like member, can position said hook generally below said channel member, generally above and forwardly of said channel member, and generally above and rearwardly of said channel member.

13. A multi-purpose support for use with an implement that may be attached to a source of rotating and/or hydraulic power, and wherein the implement has a forwardly extending tongue terminating in a connection to the power source, said support comprising:
a generally elongate channel member with a width between first and second opposing side walls and having a first end and an opposing second end, said channel member capable of being affixed to the tongue of the implement at said first end and extending forwardly therefrom in a cantilevered fashion;
an elongate first rod-like member having a first end and an opposing second end, a generally open hook formed in a first direction in said first end thereof and a generally L-shape formed in said first direction in said second end thereof, the longer leg of said L-shape terminating in said hook, said hook and said L-shape being generally in a single plane and the shorter leg of said L-shape being of a greater length than said width between side walls of said channel member;
a latching mechanism affixed to said channel member and holding said first rod-like member, said latching mechanism rotatable in a generally fore-and-aft plane of said implement such that said hook can be selectively set in a plurality of positions around said latching mechanism,; and
said latching mechanism comprising a first hole though said first side wall and a second hole through said second side wall of said channel member close to said second end thereof, said holes having a generally common horizontal axis, a plurality of holding tabs affixed to the outside of said first side wall around said first hole and generally equally spaced therefrom, said shorter leg of said L-shape portion of said first rod-like member extending through said first and second holes in said channel member and a biasing mechanism biasing said shorter leg of said L-shape portion of said first rod-like member away from said holding tabs toward said second side of said channel member, whereby said elongate member may be selectively moved from one holding tab to another and thereby change the position of said hook relative to said first end of said channel member; and
a clasp comprising a second rod-like member with a first end and a second opposing end, said first end of said second rod-like member having a first loop formed therein and attachable to the first rod-like member and, said second end of said second rod-like member having a second loop formed therein and selectively movable, the second end of said first rod-like member may enter said second loop and a mechanism to selectively lock said second loop when said first rod-like member is extending through said second loop.

* * * * *